United States Patent
Yamamoto

(10) Patent No.: US 9,716,998 B2
(45) Date of Patent: Jul. 25, 2017

(54) BASE STATION SYSTEM AND WIRELESS TRANSMISSION APPARATUS

(71) Applicant: NEC Corporation, Tokyo (JP)

(72) Inventor: Katsushi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/903,204

(22) PCT Filed: Jul. 15, 2014

(86) PCT No.: PCT/JP2014/003745
§ 371 (c)(1),
(2) Date: Jan. 6, 2016

(87) PCT Pub. No.: WO2015/019554
PCT Pub. Date: Feb. 12, 2015

(65) Prior Publication Data
US 2016/0192183 A1    Jun. 30, 2016

(30) Foreign Application Priority Data
Aug. 6, 2013 (JP) ................................. 2013-163465

(51) Int. Cl.
*H04W 84/12* (2009.01)
*H04W 12/10* (2009.01)
(Continued)

(52) U.S. Cl.
CPC ............. *H04W 8/245* (2013.01); *H02J 7/025* (2013.01); *H02J 7/35* (2013.01); *H04L 12/10* (2013.01);
(Continued)

(58) Field of Classification Search
CPC ... H04L 12/10; H02J 7/025; H02J 7/35; H02J 2007/0096; H04W 8/245; H04W 84/12; H04W 16/26; H04W 16/28; H04B 1/40
(Continued)

(56) References Cited

U.S. PATENT DOCUMENTS 9,079,719 B2 * 7/2015 Talsma .................... B65G 21/18
9,161,385 B2 * 10/2015 Azancot ................ H04W 84/12
(Continued)

FOREIGN PATENT DOCUMENTS

EP    2 083 170 A1    7/2009
JP    10-190554       7/1998
(Continued)

OTHER PUBLICATIONS

Supplementary European Search Report issued by the European Patent Office in counterpart European Patent Application No. 14834571.3, dated Jan. 18, 2017.
(Continued)

*Primary Examiner* — Khawar Iqbal
(74) *Attorney, Agent, or Firm* — Finnegan, Henderson, Farabow, Garrett & Dunner, L.L.P.

(57) ABSTRACT

A base station system includes a base station apparatus (1) and a wireless transmission apparatus (2). The base station apparatus (1) communicates with mobile stations. The wireless transmission apparatus (2) communicates with the base station apparatus (1) and wirelessly communicate with another apparatus in order to connect the base station apparatus (1) to a mobile backhaul network. The base station apparatus (1) includes a solar cell panel (15) for generating operating power of the base station apparatus (1), and a storage battery (14). The wireless transmission apparatus (2) includes a solar cell panel (25) for generating operating power of the wireless transmission apparatus (2), and a
(Continued)

storage battery (24). The base station apparatus (1) and the wireless transmission apparatus (2) wirelessly communicate with each other. This can provide, for example, a base station system that can be easily installed and has high tolerance to accidental or intentional damage to cables.

8 Claims, 9 Drawing Sheets

(51) Int. Cl.
*H02J 7/02* (2016.01)
*H04W 8/24* (2009.01)
*H04L 12/10* (2006.01)
*H02J 7/35* (2006.01)
*H02J 7/00* (2006.01)

(52) U.S. Cl.
CPC ...... *H02J 2007/0096* (2013.01); *H04W 84/12* (2013.01)

(58) Field of Classification Search
USPC ...................................................... 455/422.1
See application file for complete search history.

(56) References Cited

U.S. PATENT DOCUMENTS

| | | | |
|---|---|---|---|
| 9,253,816 B1* | 2/2016 | Gashette | H04W 84/02 |
| 2009/0272803 A1* | 11/2009 | Solla | G06Q 10/087 |
| | | | 235/385 |
| 2011/0212682 A1* | 9/2011 | Ortiz | H04W 4/18 |
| | | | 455/3.06 |
| 2012/0296974 A1* | 11/2012 | Tabe | G06Q 50/01 |
| | | | 709/204 |
| 2013/0142136 A1* | 6/2013 | Pi | H04W 28/0289 |
| | | | 370/329 |
| 2014/0103856 A1* | 4/2014 | Jung | H02J 7/35 |
| | | | 320/101 |
| 2014/0314062 A1* | 10/2014 | Loebs | H04L 12/2803 |
| | | | 370/338 |
| 2015/0021990 A1* | 1/2015 | Myer | F21S 2/00 |
| | | | 307/23 |
| 2015/0351336 A1* | 12/2015 | Gilbert | A01G 25/16 |
| | | | 700/284 |
| 2016/0297384 A1* | 10/2016 | Guo | F25B 27/002 |

FOREIGN PATENT DOCUMENTS

| | | |
|---|---|---|
| JP | 10-336094 | 12/1998 |
| JP | 2003-332971 | 11/2003 |
| JP | 2008-122247 | 5/2008 |
| JP | 2011-119964 | 6/2011 |
| JP | 2012-253621 | 12/2012 |
| RU | 2 452 036 C1 | 5/2012 |

OTHER PUBLICATIONS

Ahmed et al., "Wired Vs Wireless Deployment Support for Wireless Sensor Networks", TENCON 2006, IEEE Region 10 Conference, XP031333247, 3 pages, Nov. 14, 2006.

International Search Report and Written Opinion mailed Sep. 16, 2014 in corresponding PCT International Application.

Decision on Grant issued by the Russian Patent Office in counterpart Russian Patent Application No. 2016103588/07(005589), dated Jan. 9, 2017.

* cited by examiner

BASE STATION SYSTEM AND WIRELESS TRANSMISSION APPARATUS

CROSS-REFERENCE TO RELATED PATENT APPLICATIONS

This application is a National Stage Entry of International Application No. PCT/JP2014/003745, filed Jul. 15, 2014, which claims priority from Japanese Patent Application No. 2013-163465, filed Aug. 6, 2013. The entire contents of the above-referenced applications are expressly incorporated herein by reference.

TECHNICAL FIELD

The present application relates to a base station system that includes a base station apparatus and a wireless transmission apparatus for connecting the base station apparatus to a mobile backhaul network.

BACKGROUND ART

A wireless transmission apparatus is commonly used for connecting a base station to a mobile backhaul network. The wireless transmission apparatus is, for example, a point-to-point wireless communication apparatus using microwaves, millimeter waves or the like and communicates with a base station apparatus and also wirelessly communicates with another apparatus. Wireless connection between the base station and the mobile backhaul network has advantages over wired connection using optical fibers in terms of easy network construction, high economic efficiency, and relaxed restrictions on the installation location of the base station.

The mobile backhaul network includes communication lines that connect base stations of a cellular communication system to a core network, or communication lines that connect between base stations, or both of them. In other words, the mobile backhaul network is an upper-level network to which base stations are connected. The mobile backhaul network includes, for example, control nodes that exchange signaling messages with base stations and with mobile stations, switching nodes that process voice calls, and packet transfer nodes that transfer user packets. The mobile backhaul network is typically a network managed by a mobile network operator (mobile operator). The mobile backhaul network includes, for example, a core network and, in some architecture, also includes a radio access network. For example, in the case of Universal Mobile Telecommunications System (UMTS), the mobile backhaul network may include a Radio Network Controller (RNC) and core network nodes (e.g., a Serving GPRS Support Node (SGSN), a Gateway GPRS Support Node (GGSN), and a Mobile Switching Center (MSC)). In the case of Evolved Packet System (EPS), the mobile backhaul network may include core network nodes (e.g., a Mobility Management Entity (MME), a Serving Gateway (S-GW), and a PDN Gateway (P-GW)).

CITATION LIST

Patent Literature 1: Japanese Unexamined Patent Application Publication No. 2012-253621
Patent Literature 2: ページ :2
Japanese Unexamined Patent Application Publication No. H10-336094

SUMMARY OF INVENTION

Technical Problem

In most cases, a base station and a wireless transmission apparatus are connected by a communication cable such as an optical fiber, a twisted pair cable or the like. Moreover, the base station apparatus and the wireless transmission apparatus require power supply cable connections for receiving power from an external power supply. However, the need for the communication cables and power supply cables in the base station apparatus and the wireless transmission apparatus may increase a burden of installation work. Additionally, the presence of the communication cables and power supply cables may reduce flexibility in the installation of the base station system. Further additionally, the presence of the communication cables and power supply cables may increase possibilities that the base station cannot provide communication services due to accidental or intentional damage to the communication cables or the power supply cables.

Patent Literature 1 and 2 discloses a base station that is configured to operate by power supplied from a solar cell and a storage battery and configured to be wirelessly connected to a mobile backhaul network. However, Patent Literature 1 and 2 do not indicate details about communication between the base station apparatus and a wireless transmission apparatus for connecting the base station apparatus to the mobile backhaul network and details about a power supply to the wireless transmission apparatus.

The present invention has been made based on the above findings by the present inventor, and an object of the present invention is to provide a base station system and a wireless transmission apparatus that can be easily installed and have high tolerance to accidental or intentional damage to cables.

Solution to Problem

In an aspect, a base station system includes a base station apparatus and a wireless transmission apparatus. The base station apparatus is configured to communicate with a plurality of mobile stations. The wireless transmission apparatus is configured to communicate with the base station apparatus and wirelessly communicate with another apparatus in order to connect the base station apparatus to a mobile backhaul network. The base station apparatus includes a first solar cell panel for generating operating power of the base station apparatus, and a first storage battery. The wireless transmission apparatus includes a second solar cell panel for generating operating power of the wireless transmission apparatus, and a second storage battery. The base station apparatus and the wireless transmission apparatus are configured to wirelessly communicate with each other.

In another aspect, a base station system includes a base station apparatus, a wireless transmission apparatus, and a data transfer apparatus. The base station apparatus is configured to communicate with a plurality of mobile stations. The wireless transmission apparatus is configured to wirelessly communicate with another apparatus in order to connect the base station apparatus to a mobile backhaul network. The data transfer apparatus is configured to transfer data packets or data frames between the base station apparatus and the wireless transmission apparatus. The base station apparatus includes a first solar cell panel for generating operating power of the base station apparatus, and a first storage battery. The wireless transmission apparatus includes a second solar cell panel for generating operating power of the wireless transmission apparatus, and a second storage battery. The data transfer apparatus includes a third solar cell panel for generating operating power of the data transfer apparatus, and a third storage battery. The base station apparatus and the data transfer apparatus are configured to wirelessly communicate with each other. The wireless transmission apparatus and the data transfer apparatus are configured to wirelessly communicate with each other.

In still another aspect, a wireless transmission apparatus used in a mobile backhaul network includes a point-to-point wireless device, a wireless local area network (LAN) device, a solar cell panel, a storage battery, a power supply unit, and a dustproof and waterproof enclosure. The point-to-point wireless device is configured to perform wireless transmissions to and from another apparatus. The wireless LAN device is configured to wirelessly communicate with a base station. The power supply unit is coupled to the solar cell panel and the storage battery and configured to supply power to the point-to-point wireless device and the wireless LAN device. The dustproof and waterproof enclosure accommodates the point-to-point wireless device, the wireless LAN device, the storage battery, and the power supply unit, and is coupled to the solar cell panel.

Advantageous Effects of Invention

According to the above aspects, it is possible to provide a base station system and a wireless transmission apparatus that can be easily installed and have high tolerance to accidental or intentional damage to cables.

DESCRIPTION OF EMBODIMENTS

Figure 1:
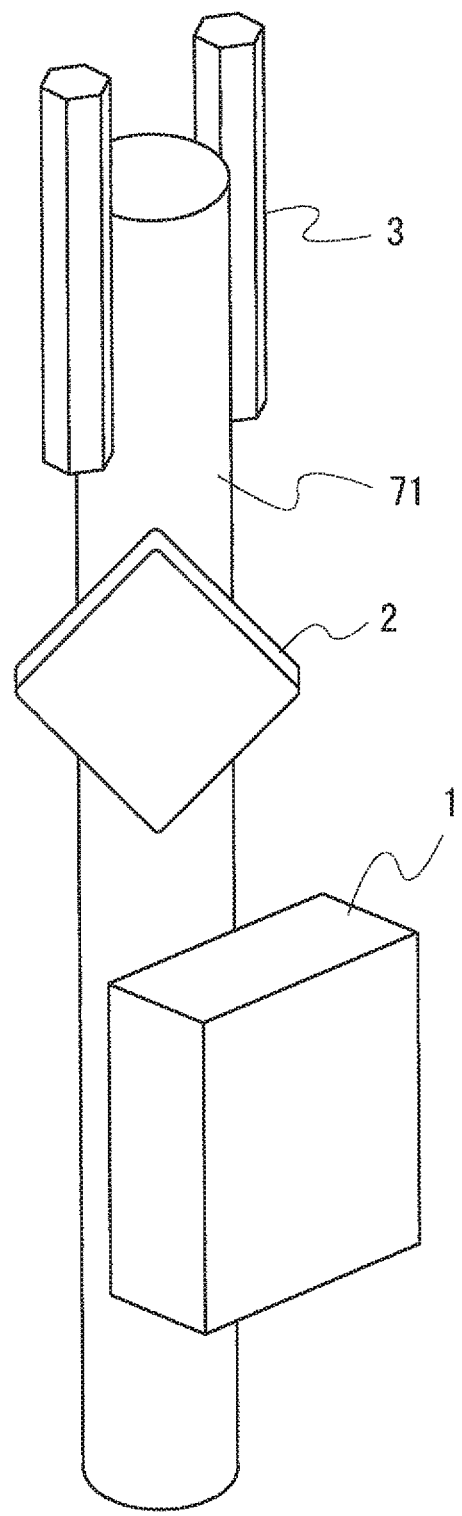
FIG. 1 is a schematic diagram of a base station system according to a first embodiment.

Hereinafter, specific embodiments will be described in detail with reference to the drawings. ページ:5
Note that in the drawings, the same elements are denoted by the same reference signs, and repeated descriptions will be omitted as needed for clarity of the explanation.

First Embodiment

Figure 2:
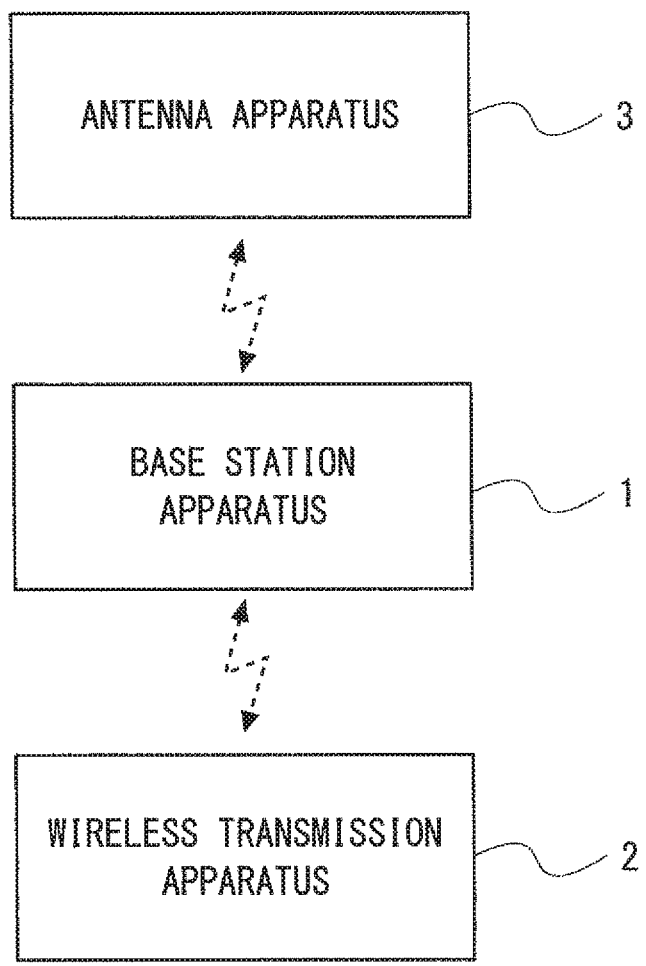
FIG. 2 is a block diagram of the base station system according to the first embodiment.

FIG. 1 is a schematic diagram showing an installation example of a base station system according to this embodiment. FIG. 2 is a block diagram showing a state of wireless connections between a base station apparatus 1, a wireless transmission apparatus 2, and an antenna apparatus 3 that are included in the base station system according to this embodiment.

The base station system according to this embodiment includes the base station apparatus 1, the wireless transmission apparatus 2, and the antenna apparatus 3, each of which can be installed outdoors. The base station apparatus 1 communicates with mobile stations in a cell. The base station apparatus 1 is, for example, a UMTS Terrestrial Radio Access Network (UMTS) base station (i.e., NodeB) or an Evolved UTRAN (E-UTRAN) base station (i.e., eNB).

In order to connect the base station apparatus 1 to a mobile backhaul network, the wireless transmission apparatus 2 is configured to communicate with the base station apparatus 1 and wirelessly communicate with another apparatus (not shown). The wireless transmission apparatus 2 and the other apparatus (not shown) are, for example, a point-to-point wireless system using microwaves, millimeter waves or the like. For example, the wireless transmission apparatus 2 uses a carrier having a frequency within a range of 6 GHz to 90 GHz, provides a transmission rate of about 100 Mbit/s to 10 Gbit/s bidirectionally, and provides a transmission distance of a few hundred meters to a several dozens of kilometers.

The antenna apparatus 3 includes an antenna for enabling the base station apparatus 1 to communicate with mobile stations. The antenna apparatus 3 may be wireless equipment called a Remote Radio Head (RRH) or Radio Equipment (RE). To be more specific, the antenna apparatus 3 may include a digital circuit for performing digital signal processing (e.g., filtering) and communications with the base station apparatus 1 via a standard interface such as Open Base Station Architecture Initiative (OBSAI), Common Public Radio Interface (CPRI), or the like, and also includes an analog circuit for performing frequency conversion and amplification. In this case, the base station apparatus 1 corresponds to a Base Band Unit (BBU) or a Radio Equipment Controller (REC) and performs processes of: overall control and monitoring on the radio base station; communication with a mobile core network; scheduling; and digital baseband signal processing.

Moreover, in this embodiment, each of the base station apparatus 1, the wireless transmission apparatus 2, and the antenna apparatus 3 includes a solar cell panel for generating operating power of each apparatus, and a storage battery. Thus, each of the base station apparatus 1, the wireless transmission apparatus 2, and the antenna apparatus 3 does not need to be connected to a power supply cable for receiving power from an external power supply. Additionally, as shown in FIG. 2, the base station apparatus 1 and the wireless transmission apparatus 2 are configured to wirelessly communicate with each other, and the base station apparatus 1 and the antenna apparatus 3 are also configured to wirelessly communicate with each other. The wireless communication between the base station apparatus 1 and the wireless transmission apparatus 2 and the wireless communication between the base station apparatus 1 and the antenna apparatus 3 may be performed using, for example, a wireless Local Area Network (LAN) interface compliant with the IEEE 802.11 standard. Thus, there is no need for any communication cable connections (e.g., optical fiber cables, coaxial cables, or twisted pair cables) between the base station apparatus 1 and the wireless transmission apparatus 2 and there is also no need for any communication cable connections between the base station apparatus 1 and the antenna apparatus 3.

Accordingly, the base station system according to this embodiment can facilitate installation work. This is because work of connecting communication cables to enable the base station apparatus 1, the wireless transmission apparatus 2, and the antenna apparatus 3 to communicate with each other will become unnecessary, and work of connecting the power supply cable to these apparatuses for externally supplying power to them will also become unnecessary. Further, the base station system according to this embodiment can reduce possibilities that the base station cannot provide communication services due to accidental or intentional damage to the communication cables or the power supply cables. This is because it is possible to eliminate the communication cables and the power supply cables that are exposed outside the base station apparatus 1, the wireless transmission apparatus 2, and the antenna apparatus 3.

Furthermore, the base station system according to this embodiment can obtain, by means of the solar cell panels, electrical power necessary for connecting the base station apparatus 1 to the mobile backhaul network and for enabling the base station apparatus 1 to provide cellular communication services. Accordingly, the base station system can provide cellular communication services in regions where it is difficult to receive electrical power from an external power supply (e.g., desert areas, remote islands).

Next, an installation example and a configuration example of the base station apparatus 1, the wireless transmission apparatus 2, and the antenna apparatus 3 according to this embodiment will described in more detail. In the example of FIG. 1, the base station apparatus 1, the wireless transmission apparatus 2, and the antenna apparatus 3 are mounted on a surface 71 of a circular column. As all of these apparatuses 1 to 3 can be mounted on a surface of a wall or a column, flexibility in the installation of the base station system can be further improved. Note that, although the example of FIG. 1 shows a layout where the three apparatuses 1 to 3 are mounted on the column surface 71 and disposed proximate to each other, such a layout is merely an example. In some implementations, the wireless transmission apparatus 2 and the antenna apparatus 3 may be mounted on the column surface 71, and the base station apparatus 1 may be mounted on another place (e.g., an outer wall surface of a building).

Figure 3:
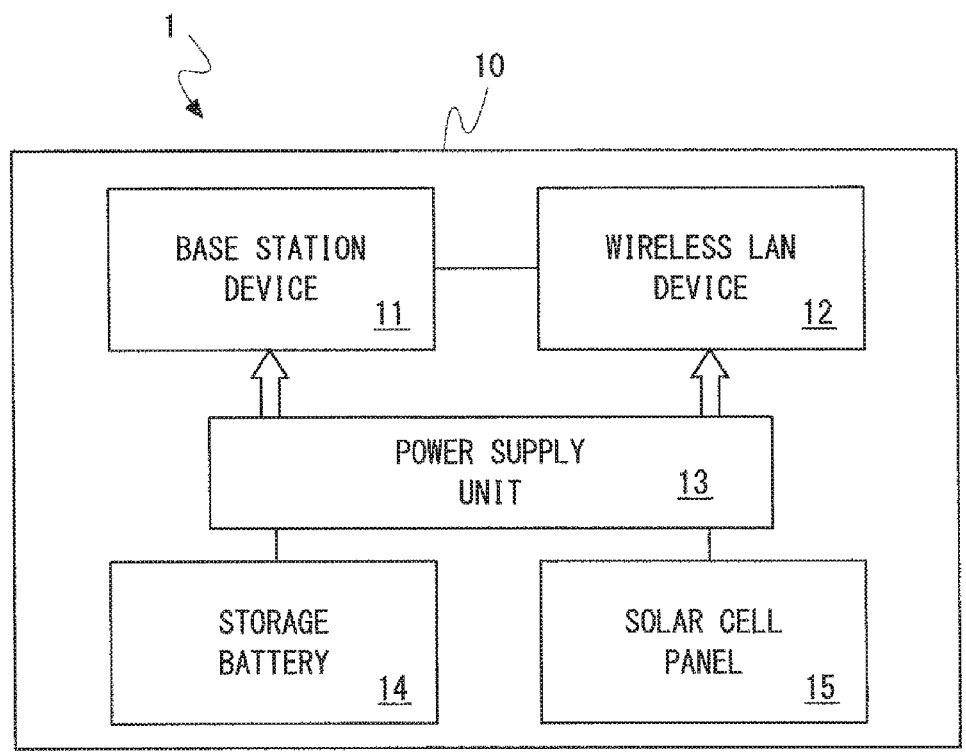
FIG. 3 is a block diagram showing a configuration of a base station apparatus included in the base station system according to the first embodiment.

FIG. 3 is a block diagram showing a configuration example of the base station apparatus 1. In the configuration example of FIG. 3, the base station apparatus 1 includes an enclosure 10. The enclosure 10 provides a degree of protection from water and dust ingress necessary for being installed outdoors, and accommodates a base station device 11, a wireless LAN device 12, a power supply unit 13, a storage battery 14, and a solar cell panel 15 therein. When the solar cell panel 15 is accommodated inside the enclosure 10, at least a part of the enclosure 10 (i.e., a part to provide a path for light to be incident on the solar cell panel 15) may be formed of a material that sufficiently transmits light in a wavelength range for enabling the solar cell panel 15 to generate power. Note that, the solar cell panel 15 may be attached to outside of the enclosure 10.

The base station device 11 is communication equipment operating as a base station. The wireless LAN device 12 is communication equipment for wirelessly communicating with the wireless transmission apparatus 2 and with the antenna apparatus 3. An antenna of the wireless LAN device 12 may be attached to outside of the enclosure 10. In the wireless LAN device 12, communication equipment for communicating with the wireless transmission apparatus 2 and communication equipment for communicating with the antenna apparatus 3 may be a common single piece of communication equipment or two pieces of independent communication equipment.

The power supply unit 13 is connected to the storage battery 14 and configured to supply power stored in the storage battery 14 to the base station device 11 and the wireless LAN device 12. Further, the power supply unit 13 is configured to charge the storage battery 14 with the power generated by the solar cell panel 15.

Figure 4:
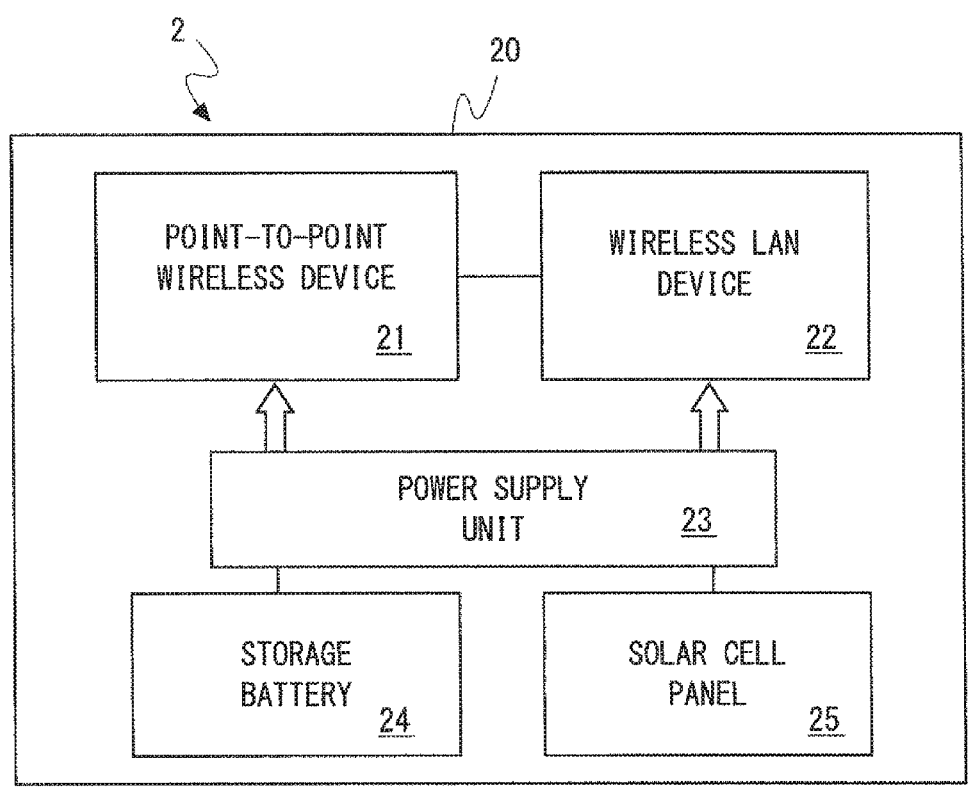
FIG. 4 is a block diagram showing a configuration of a wireless transmission apparatus included in the base station system according to the first embodiment.

FIG. 4 is a block diagram showing a configuration example of the wireless transmission apparatus 2. In the configuration example of FIG. 4, the wireless transmission apparatus 2 includes an enclosure 20. The enclosure 20 provides a degree of protection from water and dust ingress necessary for being installed outdoors, and accommodates a point-to-point wireless device 21, a wireless LAN device 22, a power supply unit 23, a storage battery 24, and a solar cell panel 25 therein. When the solar cell panel 25 is accommodated inside the enclosure 20, at least a part of the enclosure 20 (i.e., a part to provide a path for light to be incident on the solar cell panel 25) may be formed of a material that sufficiently transmits light in a wavelength range for enabling the solar cell panel 25 to generate power. Note that, the solar cell panel 25 may be attached to outside of the enclosure 20.

The point-to-point wireless device 21 is communication equipment for wirelessly communicating with another apparatus (not shown) to connect the base station apparatus 1 to the mobile backhaul network. The wireless LAN device 22 is communication equipment for wirelessly communicating with the base station apparatus 1. An antenna of the point-to-point wireless device 21 may be attached to outside of the enclosure 20. Likewise, an antenna of the wireless LAN device 22 may be attached to outside of the enclosure 20.

The power supply unit 23 is connected to the storage battery 24 and configured to supply power stored in the storage battery 24 to the point-to-point wireless device 21 and the wireless LAN device 22. Further, the power supply unit 23 is configured to charge the storage battery 24 with the power generated by the solar cell panel 25.

Figure 5:
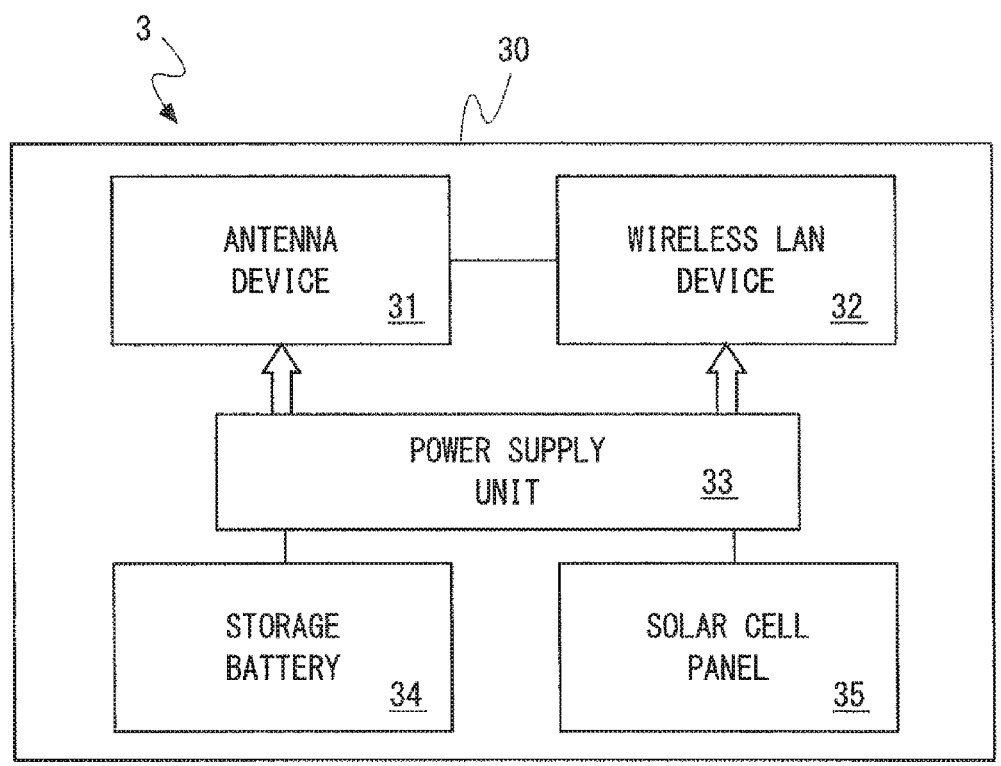
FIG. 5 is a block diagram showing a configuration of an antenna apparatus included in the base station system according to the first embodiment.

FIG. 5 is a block diagram showing a configuration example of the antenna apparatus 3. In the configuration example of FIG. 5, the antenna apparatus 3 includes an enclosure 30. The enclosure 30 provides a degree of protection from water and dust ingress necessary for being installed outdoors, and accommodates an antenna device 31, a wireless LAN device 32, a power supply unit 33, a storage battery 34, and a solar cell panel 35 therein. When the solar cell panel 35 is accommodated inside the enclosure 30, at least a part of the enclosure 30 (i.e., a part to provide a path for light to be incident on the solar cell panel 25) may be formed of a material that sufficiently transmits light in a wavelength range for enabling the solar cell panel 35 to generate power. Note that, the solar cell panel 35 may be attached to outside of the enclosure 30.

The antenna device 31 includes an antenna and a signal processing unit for enabling the base station apparatus 1 to communicate with mobile stations. The antenna included in the antenna device 31 may be attached to outside of the enclosure 30. The signal processing unit of the antenna device 31 may include the above-mentioned RRH (or RE) function. The signal processing unit of the antenna device 31 may communicate with the base station apparatus 1 via the wireless LAN device 32 using, for example, a standard interface (e.g., OBSAI, CPRI) between the RRH and BBU.

The wireless LAN device 32 is communication equipment for wirelessly communicating with the base station apparatus 1. An antenna of the wireless LAN device 32 may be attached to outside of the enclosure 30.

The power supply unit 33 is connected to the storage battery 34 and configured to supply power stored in the storage battery 34 to the antenna device 31 and the wireless LAN device 32. Further, the power supply unit 33 is configured to charge the storage battery 34 with the power generated by the solar cell panel 35.

The degree of protection from water and dust ingress of the enclosures 10, 20, and 30 may be equivalent to the degree of IP65 according to IEC60529 defined by International Electrotechnical Commission (IEC).

In the configuration examples shown in FIGS. 3 to 5, each of the base station apparatus 1, the wireless transmission apparatus 2, and the antenna apparatus 3 has an integrated and miniaturized structure that is accommodated inside the enclosure 10, 20, or 30 which can be installed outdoors. Moreover, the base station apparatus 1, the wireless transmission apparatus 2, and the antenna apparatus 3 do not need to have power supply cables connected to them, and also do not need to have communication cables between them. Thus, according to the configuration examples shown in FIGS. 3 to 5, it is possible to provide a base station system that has excellent environmental durability, ease of installation, and also high tolerance to any damage to cables.

Further, in the configuration examples shown in FIGS. 3 to 5, these apparatuses can obtain the power necessary for operating them from the power generated by the solar cell panels. Accordingly, these apparatuses can connect the base station apparatus 1 to the mobile backhaul network and enables the base station apparatus 1 to provide cellular communication services in regions where it is difficult to receive electrical power from an external power supply (e.g., desert areas, remote islands).

Second Embodiment

Figure 6:
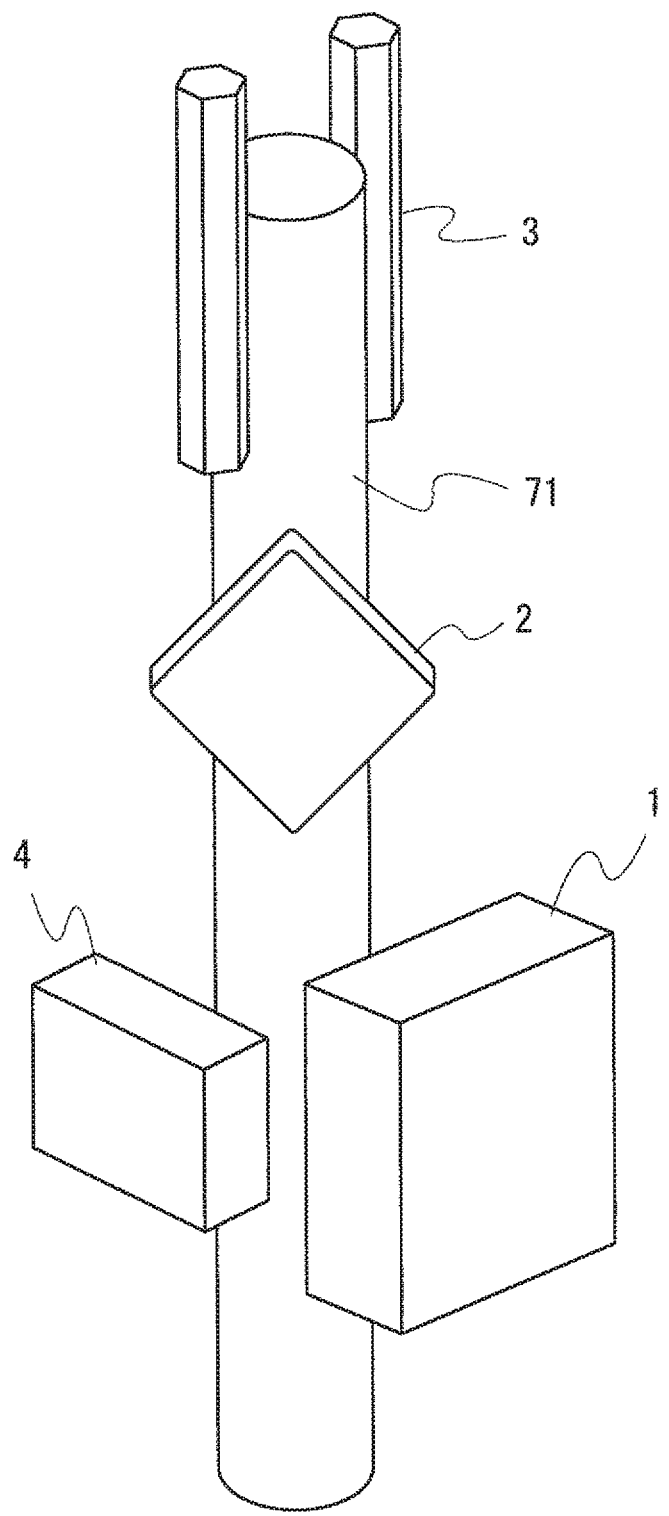
FIG. 6 is a schematic diagram of a base station system according to a second embodiment.

In this embodiment, a modified example of the base station system according to the first embodiment will be described. FIG. 6 is a schematic diagram showing an installation example of a base station system according to this embodiment. The base station system according to this embodiment further includes a data transfer apparatus 4 in addition to the above-mentioned base station apparatus 1, wireless transmission apparatus 2, and antenna apparatus 3. The data transfer apparatus 4 transfers data packets or data frames (e.g., IP packets, Media Access Control (MAC) frames). The data transfer apparatus 4 is, for example, a router, a layer 3 switch, or a layer 2 switch. The data transfer apparatus 4 is also configured in such a way that it can be installed outdoors.

Figure 7:
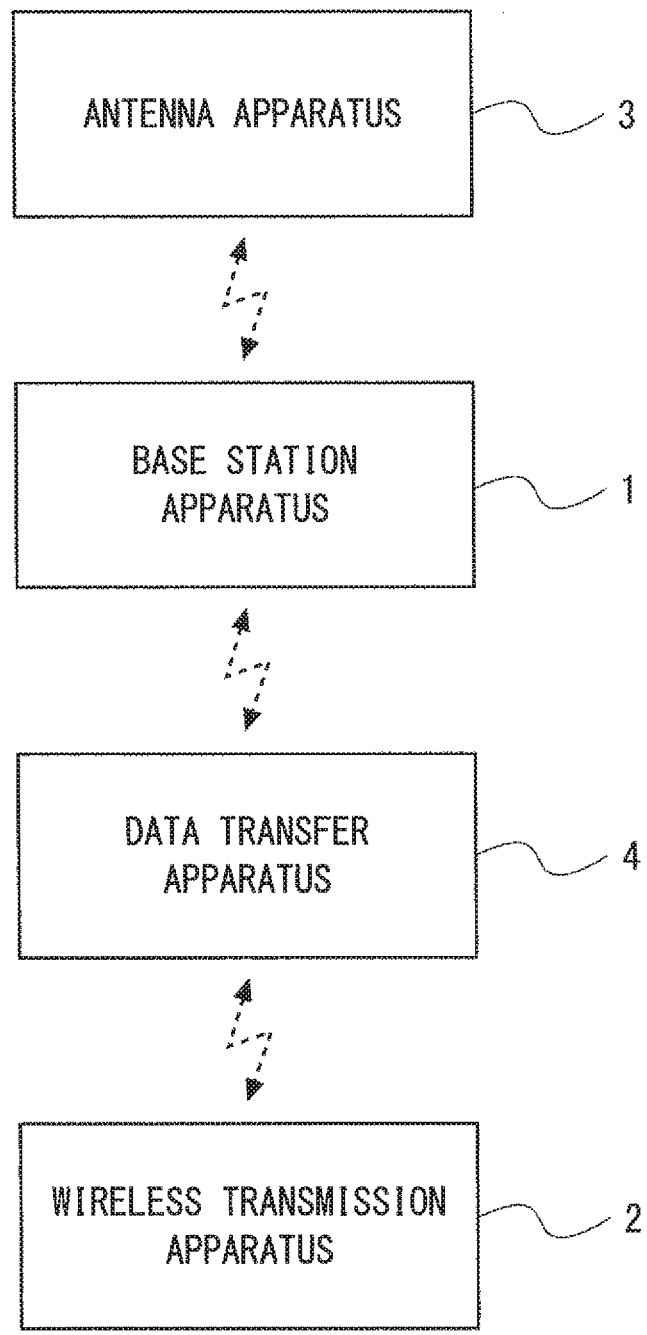
FIG. 7 is a block diagram of the base station system according to the second embodiment.

FIG. 7 is a block diagram showing a state of wireless connections between the base station apparatus 1, the wireless transmission apparatus 2, the antenna apparatus 3, and the data transfer apparatus 4 that are included in the base station system according to this embodiment. The data transfer apparatus 4 transfers data packets or data frames between the base station apparatus 1 and the wireless transmission apparatus 2. The base station apparatus 1 and the data transfer apparatus 4 are configured to wirelessly communicate with each other using, for example, a wireless LAN interface. Further, the wireless transmission apparatus 2 and the data transfer apparatus 4 are configured to wirelessly communicate with each other using, for example, a wireless LAN interface. Thus, there is no need for any communication cable connections (e.g., optical fiber cables, coaxial cables, or twisted pair cables) between the base station apparatus 1 and the data transfer apparatus 4 and there is also no need for any communication cable connections between the wireless transmission apparatus 2 and the data transfer apparatus 4.

Furthermore, the data transfer apparatus 4 includes a solar cell panel for generating operating power of the data transfer apparatus 4, and a storage battery. Thus, the data transfer apparatus 4, similar to the apparatuses 1 to 3, does not need to be connected to a power supply cable for receiving power from an external power supply.

Accordingly, the base station system according to this embodiment can facilitate installation work in a manner similar to the first embodiment. Further, the base station system according to this embodiment can reduce possibilities that the base station cannot provide communication services due to accidental or intentional damage to the communication cables or the power supply cables.

Next, a configuration example of the data transfer apparatus 4 according to this embodiment will be described in more detail. Configurations of the base station apparatus 1, the wireless transmission apparatus 2, and the antenna apparatus 3 may be the same as those of the corresponding apparatuses shown in FIGS. 3 to 5, which have been described in the first embodiment.

Figure 8:
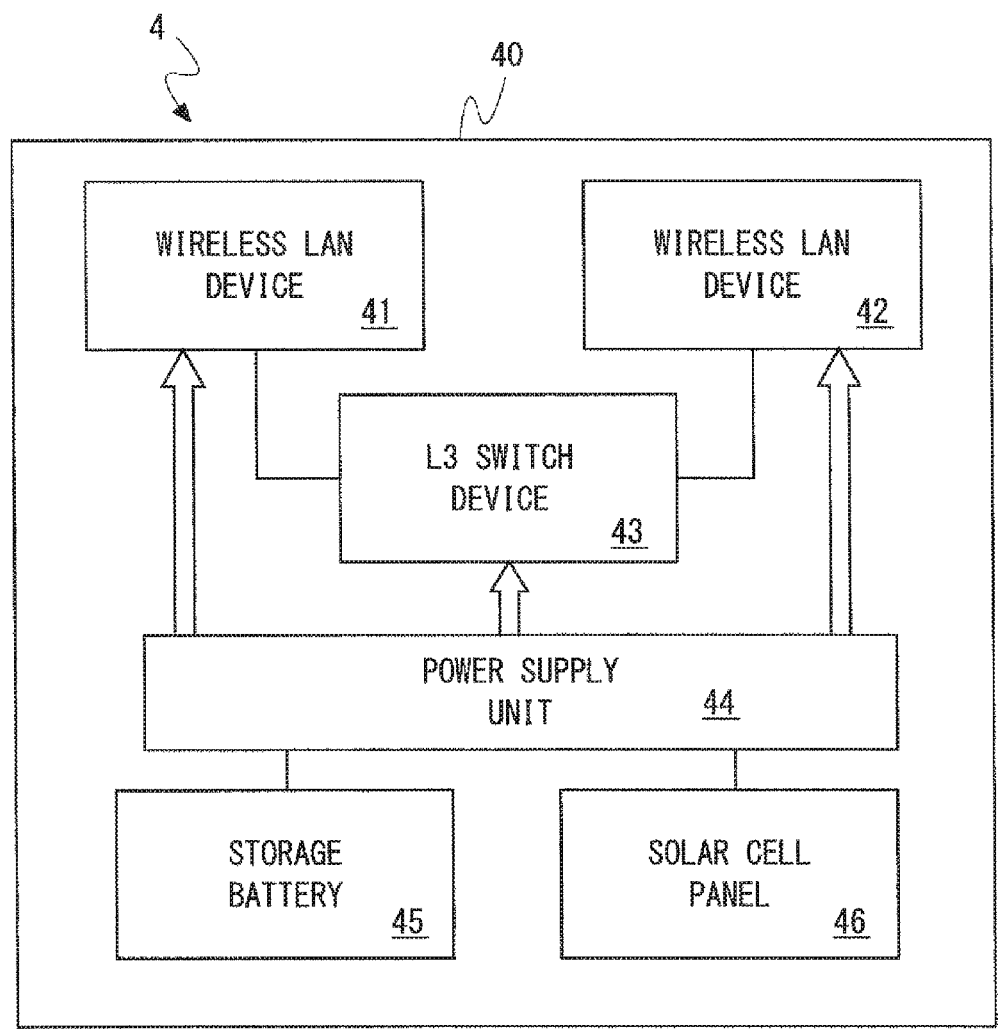
FIG. 8 is a block diagram showing a configuration of a data transfer system included in the base station system according to the second embodiment.

FIG. 8 is a block diagram showing a configuration example of the data transfer apparatus 4. In the configuration example of FIG. 8, the data transfer apparatus 4 includes an enclosure 40. The enclosure 40 provides a degree of protection from water and dust ingress necessary for being installed outdoors, and accommodates a wireless LAN device 41, a wireless LAN device 42, a layer 3 switch device 43, a power supply unit 44, a storage battery 45, and a solar cell panel 46 therein. When the solar cell panel 46 is accommodated inside the enclosure 40, at least a part of the enclosure 40 (i.e., a part to provide a path for light to be incident on the solar cell panel 46) may be formed of a material that sufficiently transmits light in a wavelength range for enabling the solar cell panel 46 to generate power. Note that, the solar cell panel 46 may be attached to outside of the enclosure 40.

The wireless LAN device 41 is communication equipment for wirelessly communicating with the base station apparatus 1. The wireless LAN device 42 is communication equipment for wirelessly communicating with the wireless transmission apparatus 2. The layer 3 switch device 43 transfers IP packets between the base station apparatus 1 and the wireless transmission apparatus 2 via the wireless LAN devices 41 and 42. Antennas of the wireless LAN devices 41 and 42 may be attached to outside of the enclosure 40.

The power supply unit 44 is connected to the storage battery 45 and configured to supply power stored in the storage battery 45 to the wireless LAN devices 41 and 42, and the layer 3 switch device 43. Further, the power supply unit 44 is configured to charge the storage battery 45 with the power generated by the solar cell panel 46.

In the configuration example shown in FIG. 8, the data transfer apparatus 4 has an integrated and miniaturized configuration that is accommodated inside the enclosure 40 which can be installed outdoors. Moreover, the data transfer apparatus 4 does not need to have a power supply cable, and also does not need to have communication cables connected with the base station apparatus 1 and with the wireless transmission apparatus 2. Thus, according to the configuration example shown in FIG. 8, it is possible to provide a base station system that has excellent environmental durability, ease of installation, and also high tolerance to any damage to cables.

Third Embodiment

Figure 9:
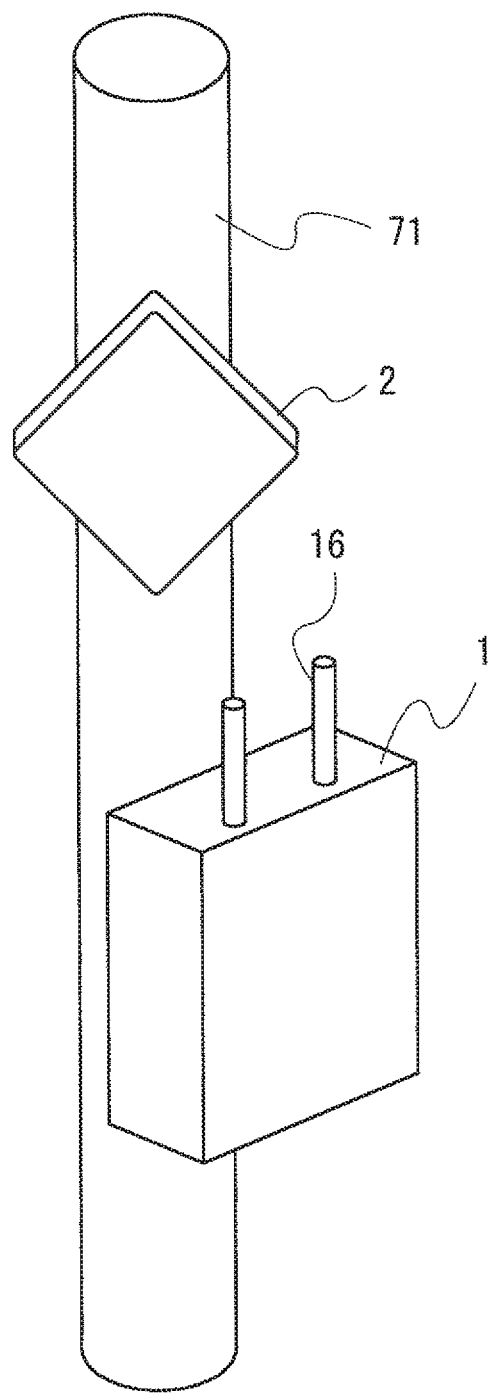
FIG. 9 is a schematic diagram of a base station system according to a third embodiment.

In the first and second embodiments, configurations in which the antenna apparatus 3 is separated from the base station apparatus 1 have been described. However, in the first and second embodiments, the antenna for enabling the base station apparatus 1 to communicate with the plurality of mobile stations may be attached to the enclosure of the base station apparatus 1. FIG. 9 shows a modification of the configuration example shown in FIG. 1 and shows a configuration in which antennas 16 are directly attached to the enclosure of the base station apparatus 1. In the configuration example of FIG. 9, the wireless communication between the base station apparatus 1 and the antenna apparatus 3 that has been described in the first and second embodiments is not necessary.

Other Embodiments

In the first to third embodiments, examples in which one base station apparatus 1 and one wireless transmission apparatus 2 are used have been described. However, for example, when a traffic demand is large in an installation location of a base station system, a plurality of base station apparatuses 1 may be installed. In this case, one wireless transmission apparatus 2 may be used to connect the plurality of base station apparatuses 1 to the mobile backhaul network. At this time, multiplexing traffic of the plurality of base station apparatuses 1 may be performed by multiplexing packets (frames) in the data transfer apparatus 4 or by a multiplexing function of the wireless transmission apparatus 2. Moreover, when a connection to the mobile backhaul network is made redundant, or when traffic of a base station placed at another installation location is relayed, a plurality of wireless transmission apparatuses 2 may be installed.

The above embodiments are merely examples to which technical ideas achieved by the present inventor have been applied. That is, it is obvious that the technical ideas are not limited to the above-mentioned embodiments, and various modifications can be made therein.

INDUSTRIAL APPLICABILITY

ページ:16

The present application is based upon and claims the benefit of priority from Japanese Patent Application No. 2013-163465, filed on Aug. 6, 2013, the entire contents of which are hereby incorporated by reference.

REFERENCE SIGNS LIST

1 BASE STATION APPARATUS
2 WIRELESS TRANSMISSION APPARATUS
3 ANTENNA APPARATUS
4 DATA TRANSFER APPARATUS
10, 20, 30, 40 ENCLOSURE
11 BASE STATION DEVICE
12, 22, 32, 41, 42 WIRELESS LAN DEVICE
13, 23, 33, 44 POWER SUPPLY UNIT
14, 24, 34, 45 STORAGE BATTERY
15, 25, 35, 46 SOLAR CELL PANEL
16 ANTENNA
21 POINT-TO-POINT WIRELESS DEVICE
31 ANTENNA DEVICE
43 LAYER 3 SWITCH DEVICE

The invention claimed is:

1. A base station system comprising:
a base station apparatus configured to communicate with a plurality of mobile stations;
a wireless transmission apparatus configured to communicate with the base station apparatus and wirelessly communicate with another apparatus in order to connect the base station apparatus to a mobile backhaul network; and
an antenna apparatus that is used to communicate with the plurality of mobile stations, wherein
the base station apparatus comprises a first solar cell panel for generating operating power of the base station apparatus, and a first storage battery,
the wireless transmission apparatus comprises a second solar cell panel for generating operating power of the wireless transmission apparatus, and a second storage battery,
the base station apparatus and the wireless transmission apparatus are configured to wirelessly communicate with each other,
the antenna apparatus comprises a third solar cell panel for generating operating power of the antenna apparatus, and a third storage battery,
the base station apparatus and the antenna apparatus are configured to wirelessly communicate with each other,
the base station apparatus and the antenna apparatus are configured to communicate with each other without any communication cable connections between the base station apparatus and the antenna apparatus, and
the antenna apparatus is configured to operate without any power supply cable connections for receiving power from an external power supply.

2. The base station system according to claim 1, wherein
the base station apparatus and the wireless transmission apparatus are configured to communicate with each other without any communication cable connections between the base station apparatus and the wireless transmission apparatus, and
each of the base station apparatus and the wireless transmission apparatus is configured to operate without any power supply cable connections for receiving power from an external power supply.

3. The base station system according to claim 1, wherein
the base station apparatus further comprises a first enclosure to which the first solar cell panel is attached,
the first enclosure accommodates the first storage battery, communication equipment operating as a base station, and communication equipment for wirelessly communicating with the wireless transmission apparatus, and provides a degree of protection from water and dust ingress necessary for being installed outdoors,
the wireless transmission apparatus further comprises a second enclosure to which the second solar cell panel is attached, and
the second enclosure accommodates the second storage battery, communication equipment for wirelessly communicating with the other apparatus, and communication equipment for wirelessly communicating with the base station apparatus, and provides a degree of protection from water and dust ingress necessary for being installed outdoors.

4. The base station system according to claim 1, wherein
the base station apparatus further comprises a first enclosure that accommodates the first solar cell panel, the first storage battery, communication equipment operating as a base station, and communication equipment for wirelessly communicating with the wireless transmission apparatus, and that provides a degree of protection from water and dust ingress necessary for being installed outdoors, and
the wireless transmission apparatus further comprises a second enclosure that accommodates the second solar cell panel, the second storage battery, communication equipment for wirelessly communicating with the other apparatus, and communication equipment for wirelessly communicating with the base station apparatus, and that provides a degree of protection from water and dust ingress necessary for being installed outdoors.

5. A base station system comprising:
a base station apparatus configured to communicate with a plurality of mobile stations;
a wireless transmission apparatus configured to wirelessly communicate with another apparatus in order to connect the base station apparatus to a mobile backhaul network;
a data transfer apparatus configured to transfer data packets or data frames between the base station apparatus and the wireless transmission apparatus; and
an antenna apparatus that is used to communicate with the plurality of mobile stations, wherein
the base station apparatus comprises a first solar cell panel for generating operating power of the base station apparatus, and a first storage battery,
the wireless transmission apparatus comprises a second solar cell panel for generating operating power of the wireless transmission apparatus, and a second storage battery,
the data transfer apparatus comprises a third solar cell panel for generating operating power of the data transfer apparatus, and a third storage battery,
the base station apparatus and the data transfer apparatus are configured to wirelessly communicate with each other,
the wireless transmission apparatus and the data transfer apparatus are configured to wirelessly communicate with each other,
the antenna apparatus comprises a fourth solar cell panel for generating operating power of the antenna apparatus, and a fourth storage battery,
the base station apparatus and the antenna apparatus are configured to wirelessly communicate with each other,
the base station apparatus and the antenna apparatus are configured to communicate with each other without any communication cable connections between the base station apparatus and the antenna apparatus, and
the antenna apparatus is configured to operate without any power supply cable connections for receiving power from an external power supply.

6. The base station system according to claim 5, wherein
the base station apparatus and the data transfer apparatus are configured to communicate with each other without any communication cable connections between the base station apparatus and the data transfer apparatus,
the wireless transmission apparatus and the data transfer apparatus are configured to communicate with each other without any communication cable connections between the wireless transmission apparatus and the data transfer apparatus, and
each of the base station apparatus, the wireless transmission apparatus, and the data transfer apparatus is configured to operate without any power supply cable connections for receiving power from an external power supply.

7. The base station system according to claim 5, wherein
the base station apparatus further comprises a first enclosure to which the first solar cell panel is attached,
the first enclosure accommodates the first storage battery, communication equipment operating as a base station, and communication equipment for wirelessly communicating with the data transfer apparatus, and provides a degree of protection from water and dust ingress necessary for being installed outdoors,
the wireless transmission apparatus further comprises a second enclosure to which the second solar cell panel is attached,
the second enclosure accommodates the second storage battery, communication equipment for wirelessly communicating with the other apparatus, and communication equipment for wirelessly communicating with the data transfer apparatus, and provides a degree of protection from water and dust ingress necessary for being installed outdoors, and
the data transfer apparatus further comprises a third enclosure to which the third solar cell panel is attached, and
the third enclosure accommodates the third storage battery, communication equipment for wirelessly communicating with the base station apparatus, and communication equipment for wirelessly communicating with the wireless transmission apparatus, and provides a degree of protection from water and dust ingress necessary for being installed outdoors.

8. The base station system according to claim 5, wherein
the base station apparatus further comprises a first enclosure that accommodates the first solar cell panel, the first storage battery, communication equipment operating as a base station, and communication equipment for wirelessly communicating with the data transfer apparatus, and that provides a degree of protection from water and dust ingress necessary for being installed outdoors,
the wireless transmission apparatus further comprises a second enclosure that accommodates the second solar cell panel, the second storage battery, communication equipment for wirelessly communicating with the other apparatus, and communication equipment for wirelessly communicating with the data transfer apparatus, and that provides a degree of protection from water and dust ingress necessary for being installed outdoors, and
the data transfer apparatus further comprises a third enclosure that accommodates the third solar cell panel, the third storage battery, communication equipment for wirelessly communicating with the base station apparatus, and communication equipment for wirelessly communicating with the wireless transmission apparatus, and that provides a degree of protection from water and dust ingress necessary for being installed outdoors.

* * * * *